United States Patent
McGrath

(10) Patent No.: US 6,876,815 B1
(45) Date of Patent: Apr. 5, 2005

(54) DATA PROCESSOR AND DATA PROCESSING METHOD FOR COMPRESSION ENCODING SOURCE DATA AND MULTIPLEXING METADATA

(75) Inventor: Mark John McGrath, Bracknell (GB)

(73) Assignee: Sony United Kingdom Limited, Weybridge (GB)

( * ) Notice: Subject to any disclaimer, the term of this patent is extended or adjusted under 35 U.S.C. 154(b) by 233 days.

(21) Appl. No.: 09/713,420

(22) Filed: Nov. 15, 2000

(30) Foreign Application Priority Data

Nov. 16, 1999 (GB) .............................................. 9927111

(51) Int. Cl.[7] .................................................. H04N 7/26
(52) U.S. Cl. ..................................... 386/109; 386/112
(58) Field of Search ............................... 386/109, 112, 386/68, 70, 1

(56) References Cited

U.S. PATENT DOCUMENTS

| | | | |
|---|---|---|---|
| 5,225,904 A | | 7/1993 | Golin et al. |
| 5,481,543 A | * | 1/1996 | Veltman ..................... 370/473 |
| 5,535,008 A | * | 7/1996 | Yamagishi et al. ......... 386/109 |
| 5,572,333 A | * | 11/1996 | Moriyama et al. ............ 386/98 |
| 5,668,598 A | | 9/1997 | Linzer et al. |
| 5,694,170 A | | 12/1997 | Tiwari et al. |
| 5,819,004 A | * | 10/1998 | Azadegan et al. ........... 386/112 |
| 5,856,973 A | | 1/1999 | Thompson |
| 5,974,225 A | * | 10/1999 | Iwamoto et al. ............ 386/112 |
| 6,100,940 A | * | 8/2000 | Dieterich ..................... 386/112 |
| 6,816,666 B1 | * | 11/2004 | Kanai et al. ................... 386/52 |

FOREIGN PATENT DOCUMENTS

| | | |
|---|---|---|
| EP | 0 550 843 | 7/1993 |
| EP | 0 677 969 | 10/1995 |
| EP | 0 742 674 | 11/1996 |
| GB | 2 306 279 | 4/1997 |
| WO | WO 94 30014 | * 12/1994 ............ H04N/7/13 |
| WO | WO 99 30504 | 6/1999 |

OTHER PUBLICATIONS

European Broadcasting Union: "EPU/SMPTE Task Force for Harmonized Standards for the Exchange of Programme Material and Bitstreams" EBU Technical Review, Aug. 1998, XP002293892.

International Organization for Standardization =Organisation Internationale de Normalisation: "Test Model 5" 1993, MPEG Test Model 5. ISO–IEC/JTC1/SC29/WG11/NO4DO. Coded Representation of Picture and Audio Information. Document AVC–491B, Version 2: Apr. 1993, Geneva, ISO, CH, page(s) 1–119, XP001150695.

* cited by examiner

Primary Examiner—Thai Tran
Assistant Examiner—James A. Fletcher
(74) Attorney, Agent, or Firm—Frommer Lawrence & Haug LLP; William S. Frommer

(57) ABSTRACT

A data processor comprises a data compression encoder which operates to compression encode source data into compression encoded data having a variable compressed data rate, a multiplexer coupled to the data compression encoder and arranged in operation to concatenate the compressed data and ancillary data into a concatenated data stream, and a control processor coupled to the multiplexer and arranged in operation to control the multiplexer whereby a combined data rate of the concatenated data stream is less than or equal to a pre-determined maximum. The data processor finds application with a compression encoder which operates in accordance with an MPEG-type encoding algorithm. The source data may be representative of video signals or audio signals, and the ancillary data may be descriptive metadata.

26 Claims, 4 Drawing Sheets

BASIC AND EXTENDED UMID STRUCTURES

US 6,876,815 B1

DATA PROCESSOR AND DATA PROCESSING METHOD FOR COMPRESSION ENCODING SOURCE DATA AND MULTIPLEXING METADATA

FIELD OF THE INVENTION

The present invention relates to data processors and methods of processing data.

More particularly the present invention relates to data processing methods for producing compression encoded data, and to methods of processing source data to produce compression encoded data.

BACKGROUND OF THE INVENTION

It is known to compression encode source information in order to reduce an amount of data which the source information represents. A well known example of this is the "ZIP" coding application on conventional personal computers which allows data files to be compressed so that the information of the data file car be represented as a much smaller amount of data. This allows the information represented in the data file to be communicated by for example electronic mail, or stored on a smaller capacity disc or a smaller number of discs. Another example of data compression encoding is the encoding applied to data representative of video and audio signals, such as, for example, the standard ISO/IEC/13818-2, known as MPEG2 [4].

Although the amount of data produced after the source information has been compression encoded will of course vary in accordance with the amount of data representing the original source information, the MPEG2 encoding algorithm is one example of a compression encoding algorithm in which the amount of data produced after the source information is compression encoded varies in dependence upon the content of the source information. As a result an information source generating data at a substantially constant source data rate will result in a compression encoded data having a data rate which varies.

SUMMARY OF THE INVENTION

According to the present invention there is provided a data processor comprising a data compression encoder which operates to compression encode source data into compression encoded data having a variable compressed data rate, a multiplexer coupled to the data compression encoder and arranged in operation to concatenate the compressed data and ancillary data into a concatenated data stream, and a control processor coupled to the multiplexer and arranged in operation to control the multiplexer whereby a combined data rate of the concatenated data stream is less than or equal to a pre-determined maximum.

Typically when communicating or storing data, a rate at which the data can be communicated or stored is limited. In the case of data storage this may be as a result of the physical properties of the recording medium. In the case of communication this is typically as a result of a limited bandwidth available as a result of physical limitations or because the physically limited bandwidth must be shared. There is therefore a maximum data rate at which data can be communicated or stored.

Embodiments of the present invention provide an advantage in utilising a spare data rate which occurs when the compressed data rate of compression encoded data varies. By controlling a multiplexer which forms a concatenated data stream from the compression encoded data and ancillary data, the ancillary data may be concatenated with the compression encoded data so that the combined data rate of the concatenated data stream is less than or equal to the maximum bandwidth. Thus, a spare data bearing capacity formed from the difference between the predetermined maximum available data rate and the compression encoded data rate is utilised for ancillary data.

According to a second aspect of the present invention there is provided a method of processing source data comprising the steps of compression encoding the source data into compression encoded data having a variable compressed data rate, concatenating said compressed data and ancillary data into a concatenated data stream, wherein a combined data rate of said concatenated data stream is less than or equal to a pre-determined maximum.

In an embodiment when the signals are video signals, compressed video frames are produced and the amount of data resulting from the compression is measured. If the measured value is less than the maximum bit rate then the "spare" data available in a frame is used for recording the descriptive metadata. The ancillary data may be descriptive metadata, and may be distributed over one or more frames which may not be contiguous.

It is known to record video and/or audio signals on a data carrier such as a tape or disc and to provide at least information identifying the carrier and the video and/or audio material recorded on it. One way of doing this is to write such information on a label attached to a container containing the carrier. It is also desirable to record such information on the carrier.

However, if such information is recorded on the carrier less data space is available for recording video and/or audio signals. Thus recording such information in the video and/or audio tracks may result in the reduction of the quality of the recording video and/or audio signals. It is desired to record on a data carrier information at least identifying the recorded video and/or audio material and preferably other information descriptive of the recorded material. Such information is referred to herein and in the claims as "descriptive metadata". It is also desirable to transmit material via a data link. It is desirable that the descriptive metadata remains associated with the material as it is transmitted. It will be appreciated that the "descriptive metadata" is distinct from the metadata produced during compression encoding of e.g. an MPEG2 signal which metadata is used for encoding and/or decoding the MPEG2 signal.

In another embodiment, a minimum allocation of bits per frame is set to ensure a minimum signal quality is maintained. Subject to that minimum allocation, the quantisation of the signal is controlled to make space for the descriptive metadata.

In one embodiment, a target data rate, less than the maximum data rate may be set. The target bit rate may be dependent on the amount of metadata to be transmitted and the number of frames of, for example, video over which it is to be transmitted. Preferably a minimum data rate is also set. This allows a minimal reduction in picture quality whilst giving a high likelihood that the metadata will be distributed over a set number of frames.

In another embodiment, the data is encoded to achieve a target data rate which is a fixed percentage of the maximum data rate. This can ensure the metadata is distributed over a set number of frames but with possibly lower picture quality in the case of video.

The compression encoded data and the metadata may be transmitted via a transmission link and/or stored on data carrier such as a tape or a disc.

BRIEF DESCRIPTION OF THE DRAWINGS

For a better understanding of the present invention, reference will now be made by way of example to the accompanying drawings in which.

DESCRIPTION OF A PREFERRED EMBODIMENT

As explained above, the present invention finds application in environments in which compression encoded data is communicated or stored, and in which a rate at which data may be stored or communicated is limited to a predetermined maximum. To facilitate understanding example embodiments of the invention will be described with reference to video data, and audio data which are compression encoded in accordance with the MPEG2 standard. However as will be appreciated the present invention is not limited to this example.

Figure 1:
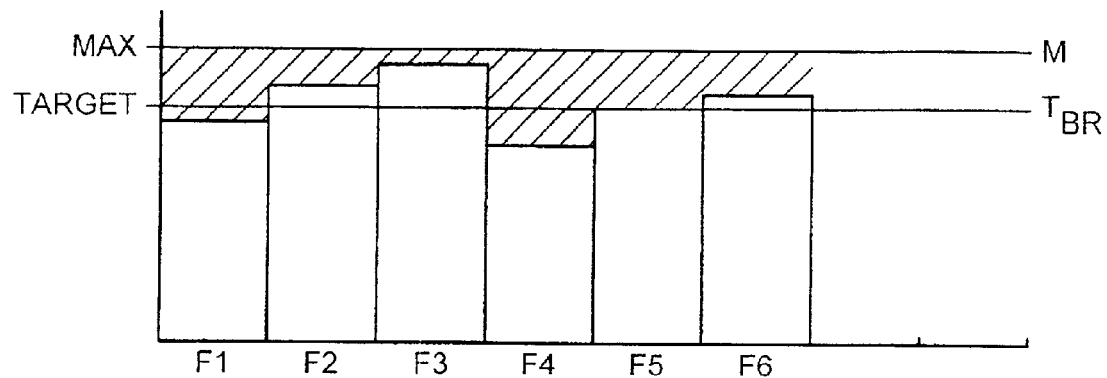
FIG. 1 is a chart illustrating possible relationships between bits per encoded frame and target and maximum numbers of bits per frame.

Referring to FIG. 1, video frames F1 to F6 are compression encoded according to, for example, MPEG2. A target bit rate TBR is set by the encoder. There is also a maximum bit rate M. The maximum bit rate is, for example, defined by the bandwidth available in a transmission link or in a signal recorder such as a tape recorder. The target bit rate is set so that the video frames are encoded at less than the maximum bit rate. The actual numbers of bits used to encode each frame depends on the content of each image represented by the video frame. Some frames e.g. F1 and F4 are encoded with a number of bits less than the target whilst other frames e.g. F2, F3, F6 are encoded with more bits than the target. In accordance with one embodiment of the present invention, the data space shown shaded between the maximum bit rate and the actual bit rate of the frames is used for the "descriptive metadata", that is metadata at least identifying the video of the encoded frames and preferably also descriptive of the video frames. An example of metadata which could be used in the present embodiments will be described hereinafter.

Figure 2:
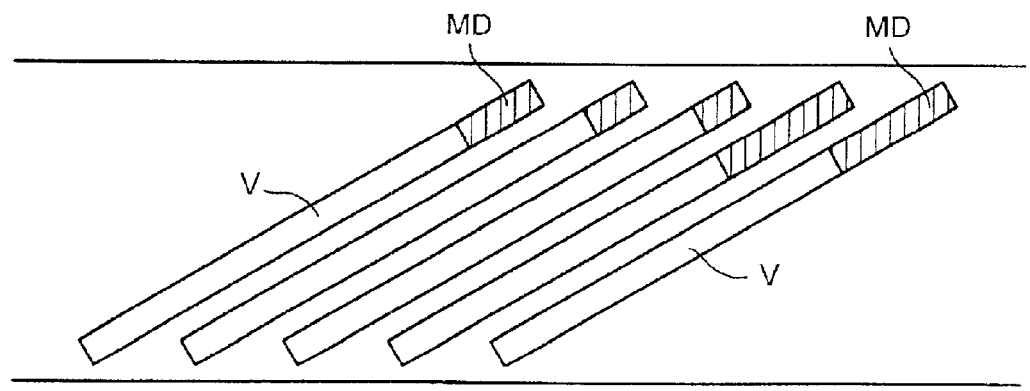
FIG. 2 schematically illustrates a tape format.

FIG. 2 shows, schematically, the format of a tape on which the compressed video frames are arranged in helical scanned tracks. In FIG. 2 each track contains one frame. In practice one frame may be spread over a croup of tracks. The data space available for recording data in each track or group of tracks is fixed and corresponds to the maximum data rate M. The compressed video frames occupy less than the whole track. The spare space shown shaded in FIG. 2 in each track is used to record the metadata.

Figure 3:
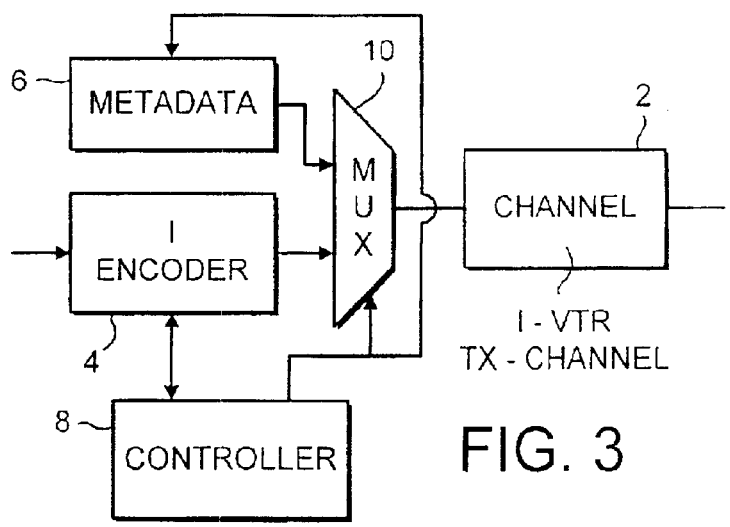
FIG. 3 is a schematic block diagram of an embodiment of the present invention.

Referring to FIG. 3, reference numeral 2 indicates a "channel" which may be a transmission channel of predetermined bandwidth or video tape recorder having a predetermined bandwidth. The predetermined bandwidth corresponds to the maximum bit rate M shown in FIG. 1.

In this example, it is assumed that the channel 2 is an "I-frame VTR" which records only intra-encoded frames, I-frames. The I-frames are produced by an l-frame encoder 4 which encodes for example baseband digital video. An example of a suitable encoder will be described with reference to FIG. 5.

Metadata descriptive of the video content of the I-frames is stored in a metadata store 6.

A controller 8 sets the target bit rate TBR of the I-frame encoder 4 to be less than the maximum bit rate M. As each frame is encoded, the controller 8 controls a multiplexer 10 and the metadata store 6 so as to concatenate with the encoded I-frames sufficient metadata so as to produce a total bit rate (I-frame plus metadata) substantially equal to but not greater than the maximum bit rate M.

The controller may control the I-frame encoder 4 and the metadata store 6 in various ways as follows:

EXAMPLE 1

Figure 4:
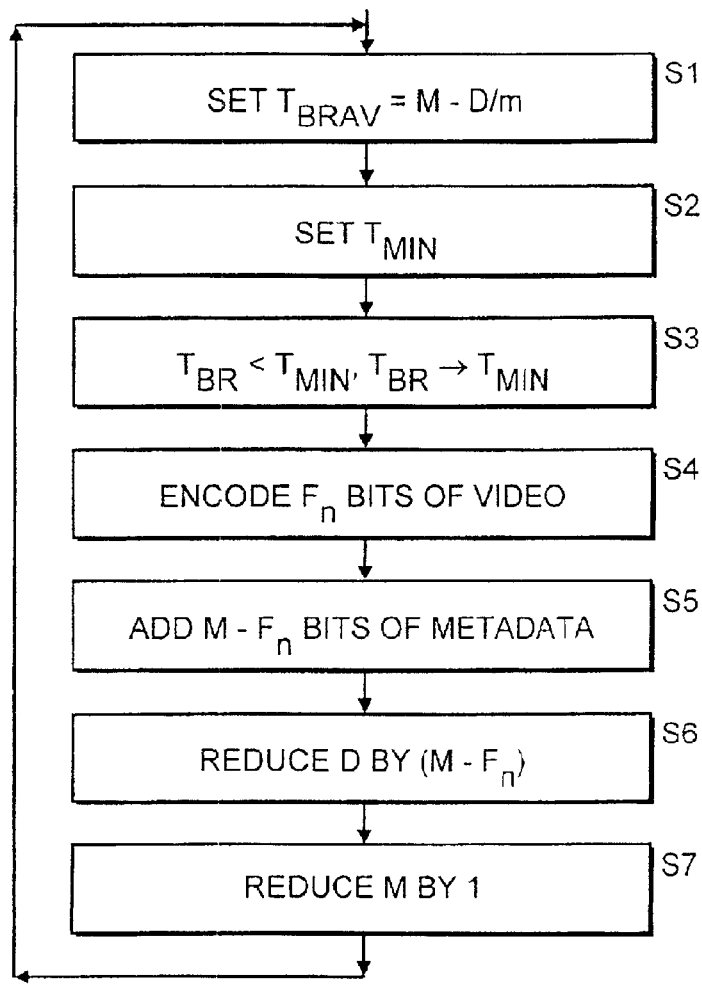
FIG. 4 is a flow chart illustrating the operation of the embodiment of FIG. 3.

Referring to FIG. 4, assume: the metadata comprises D bits which are to be spread over m-frames. The controller 8 sets an average bit rate TBRAV as M-, where NM is the maximum bit rate (S1).

The controller 8 also sets a minimum bit rate TMIN (S2). An I-frame is then encoded. It is known in the art that a "rate controller" controls the encoding of a frame according to an estimate of the bit rate TBR. That estimate is dependent upon the encoding of previous frames. If the estimate of TBR is less than TMIN, TBR is set to TMIN (S3), otherwise it is set to TBRAV.

The encoding of the frame results in Fn bits of video. Thus M−Fn bits of metadata are concatenated to the frame (S5). The number of bits D of metadata in the store 6 is reduced by M−Fn (S6) and the value of m is reduced by 1 (S7). The procedure then starts again at step S1 with the value of TBRAV set by the new values of M, D and m.

Thus the target bit rate is set at a value below the maximum bit rate which allows a predetermined amount D of metadata to be recorded over a predetermined number m of frames with minimal reduction of picture quality. The target bit rate TBR is dependent on the amount of metadata D. There is a high likelihood that the D bits of metadata will be transmitted over m frames. If a frame is encoded with the maximum number of bits M, then no metadata can be concatenated to it. Thus, metadata may be distributed over non-contiguous frames.

EXAMPLE 2

The target bit rate TBR is set at a fixed value which is a predetermined percentage of the maximum bit rate M. The encoding of the I-frames is controlled by the controller 8 so that the target bit rate is not exceeded. Thus a known fixed amount of spare data space is available for the metadata. The picture quality may be reduced compared to Example 1.

EXAMPLE 3

This example makes use of the fact that the target bit rate is less than the maximum bit rate in conventional operation of the rate controller. The target bit rate is not controlled in dependence upon the metadata as in the foregoing first and second examples. Instead whenever there is a difference between the maximum bit rate M and the target bit rate TBR metadata is concatenated to the encoded I-frame. Thus this example has a lower likelihood than Example 1 of transmitting D bits of metadata over a set number m of frames.

MPEG2 Encoder

Figure 5:
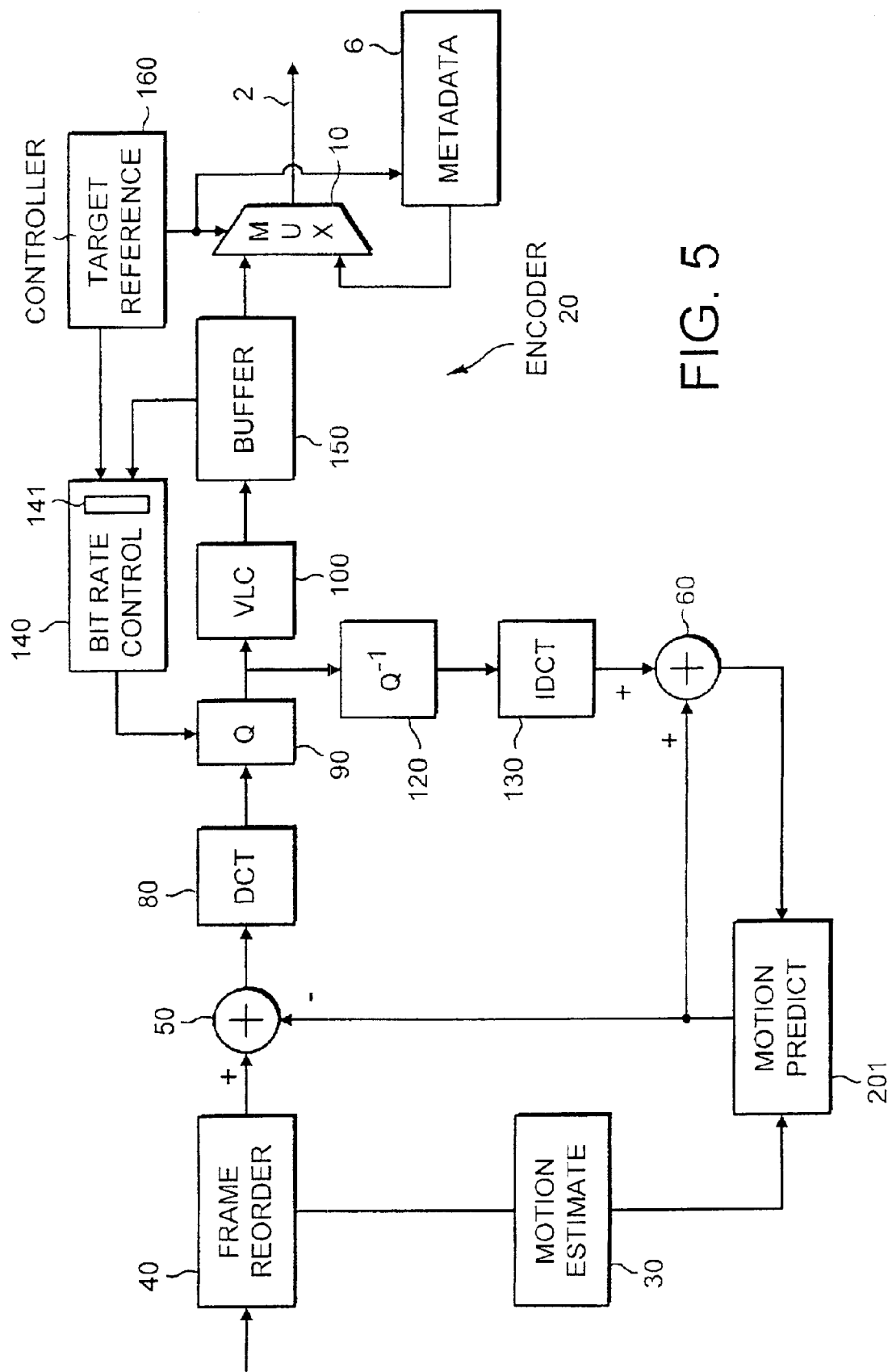
FIG. 5 is a schematic block diagram of an MPEG encoder incorporating an embodiment of the present invention.

FIG. 5 is a simplified schematic block diagram of a video data compression apparatus which includes an MPEG2 encoder comprising a frame re-ordered 40, a motion estimator 30, a motion predictor 201, a subtractor 50, an adder 60, a DCT transform unit 80, a quantiser 90, an entropy encoder 100, an inverse quantiser 120 and an inverse DCT transform unit 130.

The apparatus of FIG. 5 operates in a known manner in accordance with MPEG 2 and so will not be described in detail here.

P-pictures are encoded with respect to the nearest previous I-picture or P-picture, so that only the differences between a P-picture and the previous P- or I-picture need to be transmitted. Also, motion compensation is used to encode the differences, so a much higher degree of compression is obtained than with I-pictures.

"B-pictures" or bi-directional pictures maybe encoded with respect to two other pictures, namely the nearest previous I- or P-picture and the nearest following I- or P-picture. B-pictures are not used as references for encoding other pictures, so a still higher degree of compression can be used for B-pictures because any coding errors caused by high compression will not be propagated to other pictures.

Therefore, in each GOP there are (up to) three classes of picture, I-, P- and B-pictures, which tend to achieve different degrees of compression and so tend to require different shares of the overall available encoded bit stream. Generally, I-pictures require a large share of the available transmission or storage capacity, followed by P-pictures, and followed by B-pictures.

Briefly, therefore, the frame re-ordered 40 receives input video data and acts on successive groups of pictures (GOP) to reorder the pictures so that each picture within the GOP is compressed after those pictures on which it depends. For example, if a B-picture (bi-directionally predicted picture) depends on a following I-or P-picture, it is reordered to be compressed after that I-or P-picture.

For example, if a GOP comprises the following four initial frames (in the order in which they are displayed), 10B1B2P3 . . . , where the P-picture uses the I-picture as a reference and the two B-pictures use the surrounding I- and P-pictures as references, then the frame re-orderer 40 will reorder the GOP to be compressed in the following order; I0P3B1B2 . . .

I-pictures are intra-picture encoded, that is to say the encoding is not based on any other reference pictures. An I-picture in a GOP is therefore passed from the frame re-orderer 40 to the DCT transform unit 80, the auto quantiser 90 and the entropy encoder 100 to generate output compressed data representing that I-picture.

The compressed I-picture data is also passed through a decompression chain formed by the inverse quantiser 120, and the inverse DCT transform unit 130. This reconstructs a version of the I-picture present in the decoder which is passed to the motion predictor 20.

The next picture of the GOP to be compressed, which will generally be a P-picture which depends on the I-picture as a reference, is passed from the frame re-orderer 40 to the motion estimator 30 which generates motion vectors indicative of image motion between the I- and P-pictures. The motion predictor 201 then generates a predicted version of the P picture using the motion vectors and the decoded version of the I-picture. This predicted version of the P-picture is subtracted from the actual P-picture by the subtractor 50 and the difference between the 2 frames is passed to the DCT transform unit 80 for compression. As before, the encoded (compressed) difference data is output by the entropy encoder 100 and is decoded by the decompression chain 120, 130 to regenerate a version of the difference data.

In the adder 60 the difference data is then added to the previously decompressed version of the I-picture to generate a decompressed version of the P-picture which is then stored in the motion predictor 40 for use in the compression of the next picture.

This process continues, so that each picture which uses other pictures as a reference is in fact compressed by encoding difference data between the input picture and a version of the input picture formed by motion prediction from a previously compressed and then decompressed version of the reference picture. This means that the compression is performed with respect to the pictures which will be available at the decompressor.

The quantiser 90 quantises the DCT encoded data to achieve the target bit rates. In practice the target is not exactly achieved. The target bit rates are set separately for 1, P and B frames. They are set by a bit rate control 140. In conventional MPEG encoders the bit rate control is dependent on the content of a buffer 150. The control 140 controls the quantiser 90 to achieve the target bit rate and to keep the buffer 150 usually half full preventing over- and under-flow. The control 140 operates in accordance with Test Model 5[5] for example.

For the purposes of Examples 1 to 3 above the encoder of FIG. 5 is operated to produce only I-frames.

In accordance with the Examples 1 and 2, in the encoder of FIG. 5 the bit rate control 140 also receives from a Target Reference unit 160 a reference target bit allocation for the purpose of the Examples 1 and 2 above.

The buffer 150 provides measures of the size of I-frames (and other frames). In accordance with the examples of the present invention, the target bit allocation produced by Test Model 5, in dependence on the size measures provided by the buffer, is modified in that the target bit allocation produced by Test Model 5 is compared in a comparison unit 141 with the reference from reference unit 160 to adjust the target bit allocation. The bit rate control then supplies to the quantiser 90 quantisation parameters to enable it to produce I-frames of the size/rate required in accordance with Examples 1 and 2. For Example 3, the bit rate controller 141 operates without modification of the target bit allocation produced by Test Model 5.

The encoder of FIG. 5 may be implemented as a hardware system or by software in a special purpose data processor.

Modifications

The encoder 4 of FIG. 5 encodes baseband digital video. It may decode a GOP comprising I and P and/or B frames to digital baseband and re-encode the frames of I frames.

The encoder 4 of FIG. 5 produces only I-frames and the VTR 2 is an I-frame VTR. The encoder 4 may produce a GOP of I and P and/or B frames which are recorded as GOP in the VTR2 or transmitted via the link 2. If a GOP of I and P and/or B frames is produced then the descriptive metadata is concatenated to the frames of the GOP on a GOP basis rather than a frame basis.

Whilst Examples 1 to 3 relate to compressed video signals, embodiments of the invention may be applied to compressed audio signals.

Whilst the encoder of Figure has been described by way of example with reference to Test Model 5, it may be used with any other rate control system for controlling the sizes/bit rates of the frames. Furthermore, although the example embodiments has been illustrated as an arrangement in which the compressed video or audio signals are recorded on tape, as depicted in FIG. 2, the present invention is not limited to this example. Embodiments of the invention can be arranged to record data representative of compressed signals on to a disc, in which an available rate at which information can be recorded is limited. Furthermore embodiments of the invention can relate to any communications systems or media in which a bandwidth for transmitting compressed signals is limited.

Example of Metadata

Figure 6:
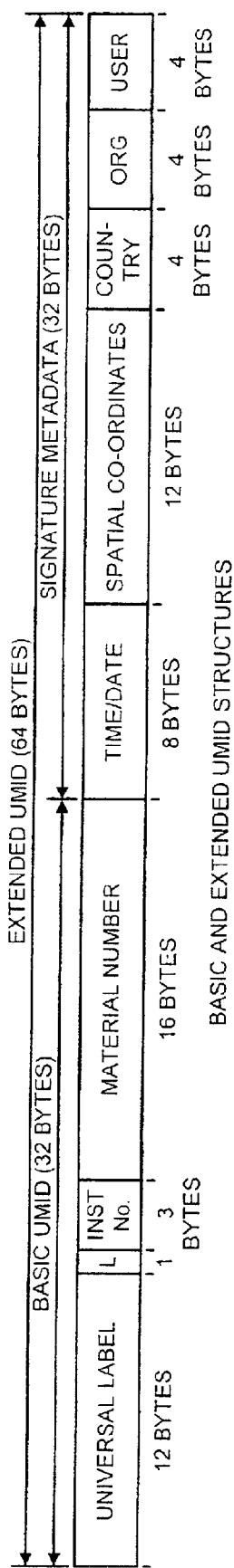
FIGS. 6 to 8 are schematic diagrams of meta data structures.
Figure 7:
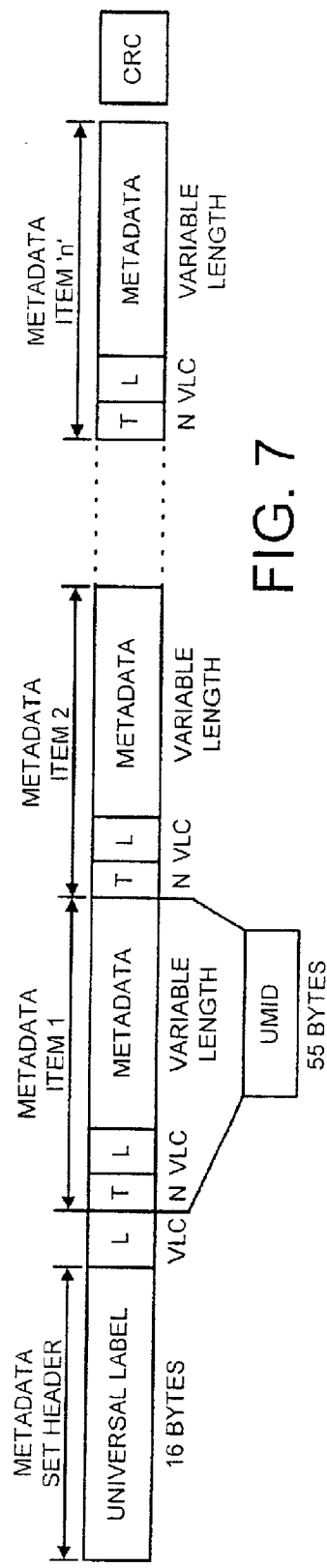

Referring to FIGS. 6 and 7, in accordance with an embodiment of the present invention, a metadata set (FIG. 7) including a UMID (FIG. 6), is recorded on the tape together with the Essence, i.e. raw video material it identifies.

The metadata set of FIG. 7 relating to the video sequence includes, as a metadata item, a UMID uniquely identifying the video sequence. The UMID will be described in more detail hereinbelow with reference to FIG. 6. The metadata set also includes, as other metadata items, other information chosen by the user and relating to the video sequence. The metadata set of FIG. 7 will be described in more detail hereinbelow.

The metadata recorded, in addition to the UMID is for example:

a) Program title
b) Material name
c) a short synopsis of the material
d) Material Type
e) a good shot mark
f) a clip stop time code
g) source aspect ratio Items a), b), c) and d) may be regarded as data descriptive of the video sequence.

Items e), f) and g) may be regarded as technical data relating to the sequence.

"Material Name" is a title, for example "Kosovo Field Report" for a clip filmed in Kosovo.

"Material Type" indicates whether the recorded material, is still video or moving video.

"Source Aspect Ratio" indicates the aspect ratio of the images recorded on the tape.

It is believed the other items are self-explanatory.

Other information may be provided instead of, or in addition to, the examples a) to g).

UMID

The UMID is described in reference [2]. Referring to FIG. 6, an extended UMID is shown. It comprises a first set of 32 bytes of basic LID and a second set of 32 bytes of signature metadata.

The first set of 32 bytes is the basic UMID. The components are:

A 12-byte Universal Label to identify this as a SMPTE UMID. It defines the type of material which the UMID identifies and also defines the methods by which the globally unique Material and locally unique Instance numbers are created.

A 1-byte length value to define the length of the remaining part of the UMID.

A 3-byte Instance number which is used to distinguish between different 'instances' of material with the same Material number.

A 16-byte Material number which is used to identify each clip. Each Material number is the same for related instances of the same material.

The second set of 32 bytes of the signature metadata as a set of packed metadata items used to create an extended UMID. The extended UMID comprises the basic UMID followed immediately by signature metadata which comprises:

An 8-byte time/date code identifying the time and date of the Content Unit

A 12-byte value which defines the spatial co-ordinates at the time of Content tion.

3 groups of 4-byte codes which register the country, organisation and user codes.

Each component of the basic and extended UMIDs will now be defined in turn.

The 12-byte Universal Label

The first 12 bytes of the UMID provide identification of the UMID by the registered string value defined in table 1.

TABLE 1

Specification of the UMID Universal Label

| Byte No. | Description | Value (hex) |
|---|---|---|
| 1 | Object Identifier | 06h |
| 2 | Label size | 0Ch |
| 3 | Designation: ISO | 2Bh |
| 4 | Designation: SMPTE | 34h |
| 5 | Registry: Dictionaries | 01h |
| 6 | Registry: Metadata Dictionaries | 01h |
| 7 | Standard: Dictionary Number | 01h |
| 8 | Version number | 01h |
| 9 | Class: Identification and location | 01h |
| 10 | Sub-class: Globally Unique Identifiers | 01h |
| 11 | Type: UMID (Picture, Audio, Data, Group) | 01, 02, 03, 04h |
| 12 | Type: Number creation method | XXh |

The hex values in table 1 may be changed: the values given are examples. Also 1–12 may have designations other than those shown by way of example in the erring to the Table 1, in the example shown byte 4 indicates that bytes 5–12 data format agreed by SMPTE. Byte 5 indicates that bytes 6 to 10 relate to "dictionary" data. Byte 6 indicates that such data is "metadata" defined by bytes 7 to 10. Byte 7 indicates the part of the dictionary containing metadata defined by bytes 9 and 10. Byte 10 indicates the version of the dictionary. Byte 9 indicates the class of data and Byte 10 indicates a particular item in the class.

In the present embodiment bytes 1 to 10 have fixed pre-assigned values. Byte 11 is variable. Thus referring to FIG. 8, and to Table 1 above, it will be noted that the bytes 1 to 10 of the label of the UMID are fixed. Therefore they may be replaced by a 1 byte 'Type' code T representing the bytes 1 to 10. The type code T is followed by a length code L. That is followed by 2 bytes, one of which is byte 11 of Table 1 and the other of which is byte 12 of Table 1, an instance number (3 bytes) and a material number (16 bytes). Optionally the material number may be followed by the signature metadata of the extended UMID and/or other metadata.

The UMID type (byte 11) has 4 separate values to identify each of 4 different data types as follows:

'01h'=UMID for Picture material
'02h'=UMID for Audio material
'03h'=UMID for Data material
'04h'=UMID for Group material (i.e. a combination of related essence).

The last (12th) byte of the 12 byte label identifies the methods by which the material and instance numbers are created. This byte is divided into top and bottom nibbles where the top nibble defines the method of Material number creation and the bottom nibble defines the method of Instance number creation.

Length

The Length is a 1-byte number with the value '13h' for basic UMIDs and '33h' for extended UMIDs.

Instance Number

The Instance number is a unique 3-byte number which is created by one of several means defined by the standard. It provides the link between a particular 'instance' of a clip and externally associated metadata. Without this instance number, all material could be linked to any instance of the material and its associated metadata.

The creation of a new clip requires the creation of a new Material number together with a zero Instance number. Therefore, a non-zero Instance number indicates that the associated clip is not the source material. An Instance number is primarily used to identify associated metadata related to any particular instance of a clip.

Material Number

The 16-byte Material number is a non-zero number created by one of several means identified in the standard. The number is dependent on a 6-byte registered port ID number, time and a random number generator.

Signature Metadata

Any component from the signature metadata may be null-filled where no meaningful value can be entered. Any null-filled component is wholly null-filled to clearly indicate a downstream decoder that the component is not valid.

The Time-Date Format

The date-time format is 8 bytes where the first 4 bytes are a UTC (Universal Time Code) based time component. The time is defined either by an AES3 32-bit audio sample clock or SMPTE 12M depending on the essence type.

The second 4 bytes define the date based on the Modified Julian Data (MJD) as defined in SMPTE 309M. This counts up to 999,999 days after midnight on the 17th Nov. 1858 and allows dates to the year 4597.

The Spatial Co-ordinate Format

The spatial co-ordinate value consists of three components defined as follows:

Altitude: 8 decimal numbers specifying up to 99,999,999 meters

Longitude: 8 decimal numbers specifying East/West 180.00000 degrees (5 decimal places active).

Latitude: 8 decimal numbers specifying North/South 90.00000 degrees (5 decimal places active).

The Altitude value is expressed as a value in meters from the centre of the earth thus allowing altitudes below the sea level.

It should be noted that although spatial co-ordinates are static for most clips, this is not true for all cases. Material captured from a moving source such as a camera mounted on a vehicle may show changing spatial co-ordinate values.

Country Code

The Country code is an abbreviated 4-byte alpha-numeric string according to the set defined in ISO 3166. Countries which are not registered can obtain a registered alpha-numeric string from the SMPTE Registration Authority.

Organisation Code

The Organisation code is an abbreviated 4-byte alpha-numeric string registered with SMPTE. Organisation codes have meaning only in relation to their registered Country code so that Organisation codes can have the same value in different countries.

User Code

The User code is a 4-byte alpha-numeric string assigned locally by each organisation and is not globally registered. User codes are defined in relation to their registered Organisation and Country codes so that User codes may have the same value in different organisations and countries.

Metadata Set

Referring to FIG. 7, the UMID and the other metadata (the data items a) to g) for example) are organised in a metadata set, one example of which is shown in FIG. 7.

The set starts with a label 40 and the UMID 41 is the first metadata item in the set.

The label comprises a SMPTE Universal label 40 of 16 bytes and which identifies the set as a SMPTE registered metadata set. The Universal Label is used to identify the metadata set and the last non-zero byte is a number which defines the size of the local Type word. A value of '1' means that the Type word is 1-byte in length, '2' means a 2-byte Type word etc. The label is followed by a Length value (1 byte) for the total length of all the metadata items in the set. The Length value is variable length encoded for efficiency.

Figure 8:
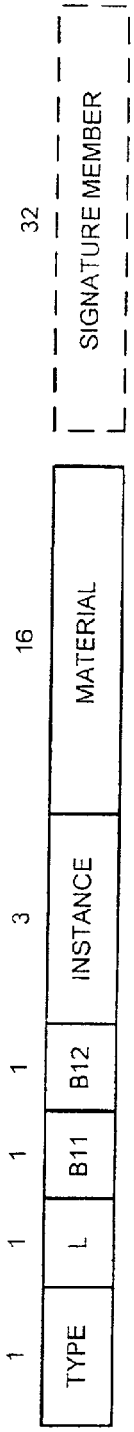

In FIG. 7, the UMID 41 occupies metadata item 1 after the label. The U-MID may be as shown in FIG. 6 or in FIG. 8. The following description assumes the UMID is as described with reference to FIG. 8 including the optional signature metadata. Thus metadata item 1 has 55 bytes as shown in FIG. 8.

Each metadata item has a sub-format which comprises a registered local 'Type' identifier (T), followed by a variable 'Length' field (L) and the metadata 'Value' as defined by the metadata 'Type' identifier. It will be appreciated that the UMID has the same format.

In this example the 'Type' identifier of each item has one or two bytes and the Length value of each item has one byte.

The 'Type' and 'Length' fields of each item are followed by a 'value' field containing data, which in the present embodiment of the invention, is a portion of the data items a) to g). The metadata items 2 to n contain the descriptive data and the technical data a) to g) discussed above.

It will be appreciated that FIGS. 6, 7 and 8 show only one example of possible metadata. The metadata may have any other suitable form.

REFERENCES

[2] EBU/SMPTE Task Force for Harrmonised Standards for the Exchange of Programme Material as Bit Streams, Final Report: Analyses and Results, Sep. 1998.

[3] EBU/IFTA Forum "Paving the Way to Future TV Archives", Vienna, 18 Jun. 1999, M. F. Vetter, TASC Inc.

[4] MPEG2-ISO/IEC/13818-2.

[5] "Test Model 5" published by

"International Organisation for Standardisation, Organisation International De Normalisation, Coded Representation of Picture and Audio Information ISO/IEC/JTC1/SC29/WG11.NO400".

I claim:

1. A signal processor comprising:

a data compression encoder which operates to compression encode source data into compression encoded data having a variable compressed data rate, said data compression encoder generating said compression encoded data in accordance with a compression encoding algorithm, the compression encoding algorithm including quantising the encoded data to produce the compression encoded data, and the compressed data rate being varied by said compression encoding algorithm in dependence upon an estimated comparison of said source data and a version of said source data produced by de-compressing said compression encoded data, a multiplexer coupled to said data compression encoder and arranged in operation to concatenate said compressed data and descriptive metadata into a concatenated data stream, the metadata describing the content of the source data, and a control processor coupled to said multiplexer and arranged in operation to control said multiplexer to the effect that a combined data rate of said concatenated data stream is less than or equal to a pre-determined maximum, wherein said control processor is coupled to said compression encoder and arranged in operation to influence said compression encoding algorithm to an effect of controlling said compressed data rate produced by said compression encoder to achieve a predetermined minimum, the influence of said compression encoding algorithm being affected by controlling said quantisation of said encoded data to provide the predetermined minimum data rate, a data rate provided for said metadata being determined in accordance with a difference between said pre-determined minimum data rate and said pre-determined maximum data rate.

2. A signal processor according to claim 1, wherein said control processor is arranged in operation to determine a target data rate for said compression encoded data rate in dependence upon an amount of said metadata to be concatenated into said concatenated data stream, and to control said compression encoder to maintain said target bit rate.

3. A processor according to claim 2, wherein the target bit rate is a rate Tb which is pre-set at a predetermined percentage of the maximum bit rate and the amount of metadata to be added.

4. A signal processor as claimed in claim 1, wherein said encoded representation of said source data is formed using a discrete cosine transform.

5. A signal processor as claimed in claim 4, wherein said compression encoding algorithm is an MPEG type algorithm.

6. A signal processor as claimed in claim 1, wherein said compression encoder produces said compression encoded data as encoded data frames.

7. A signal processor as claimed in claim 6, wherein said control processor is arranged in operation to determine said target bit rate as an average target data rate $TBR_{ave}$, in accordance with the following expression $TBR_{ave}=M-D/m$, where the maximum bit rate is M, the amount of metadata is D, and m is the number of frames over which the metadata is to be concatenated to the encoded signal.

8. A signal processor as claimed in claim 7, wherein the number of frames over which the metadata is to be concatenated m is reduced by 1 upon the encoding of each frame and the amount of metadata D is reduced by Fn upon the encoding of each frame where Fn is the amount of data symbols in the encoded frame.

9. A signal processor as claimed in claim 1, wherein the source data is representative of audio signals or video signals, or audio and video signals.

10. A data recording apparatus comprising a signal processor as claimed in claim 1 arranged in operation to produce a concatenated data stream of compression encoded data and metadata, and a recording drive arranged in operation to record the concatenated data stream produced by the signal processor onto a recording medium, the predetermined maximum data rate of the combined data rate of the concatenated data stream being determined in accordance with the bandwidth of the recording medium.

11. A data recording apparatus as claimed in claim 10, wherein said concatenated data is arranged to be recorded in helical scan tracks on said recording medium.

12. A data recording apparatus as claimed in claim 11, wherein the encoded data produced by the signal processor as part of the concatenated data stream is divided into frames and said recording drive operates to record one of said frames per track, metadata being recorded in the remainder of said track.

13. A communications apparatus which operates to communicate source data, comprising, a signal processor as claimed in claim 1, which is arranged in operation to produce a concatenated data stream, which includes the source data represented as compression encoded data with metadata, and a transmission channel having a predetermined bandwidth, wherein the predetermined maximum data rate of the concatenated data stream is determined in dependence upon the predetermined bandwidth.

14. A method of processing source data comprising the steps of compression encoding the source data into compression encoded data having a variable compressed data rate in accordance with a compression encoding algorithm, the compression encoding algorithm including quantising the encoded data to produce the compression encoded data, and the compressed data rate being varied by said compression encoding algorithm in dependence upon an estimated comparison of said source data and a version of said source data produced by de-compressing said compression encoded data, concatenating said compressed data and descriptive metadata into a concatenated data stream, the metadata describing the content of the source data, a combined data rate of said concatenated data stream being less than or equal to a pre-determined maximum;

wherein compression encoding the source data comprises
controlling said compressed data rate to maintain the compressed data rate at a predetermined minimum by quantising the encoded data to maintain the predetermined minimum rate,
determining a data rate for said metadata from a difference between said pre-determined minimum data rate and said pre-determined maximum data rate; and wherein the step of concatenating said compressed data and descriptive metadata includes concatenating said metadata at said determined rate.

15. A method as claimed in claim 14, wherein the target data rate is a rate Tb which is pre-set at a predetermined percentage of the maximum data rate and the amount of metadata added to each frame is dependent on M-Tb.

16. A method as claimed in claim 14, wherein the step of generating an encoded representation of said source data is formed using a discrete cosine transform.

17. A method as claimed in claim 16, wherein said compression encoding algorithm is an MPEG type algorithm.

18. A method as claimed in claim 14, wherein the step of compression encoding said source data comprises the step of
producing compression encoded data frames.

19. A method as claimed in claim 18, wherein the step of determining said target data rate comprises the step of determining said target data rate as an average target bit rate $TBR_{ave}$, in accordance with the following expression $TBR_{ave}=M-D/m$, where the maximum data rate is M, the amount of metadata is D, and m is the number of frames over which the metadata is to be concatenated to the encoded signal.

20. A method as claimed in claim 19, wherein the step of determining the target data rate comprises the step of reducing by 1 a number of frames m over which the metadata is to be concatenated is reduced by 1 upon the encoding of each frame, and reducing the amount of metadata D by Fn upon the encoding of each frame where Fn is the number of data symbols in the encoded frame.

21. A method as claimed in claim 14, wherein the source data is representative audio signals or video signals, or audio and video signals.

22. A method of recording data comprising producing a concatenated data stream according to the data processing method claimed in claim 14, and recording the concatenated data stream onto a recording medium, the predetermined maximum data rate of the combined data rate of the concatenated data stream being determined in accordance with the bandwidth of the recording medium.

23. A method of recording data as claimed in claim 22, wherein the step of recording comprises the step of recording said concatenated data stream in helical scan tracks on said recording medium.

24. A method of recording data as claimed in claim 23, wherein the step of producing said concatenated data stream comprises dividing said concatenated data stream into frames, and the step of recording comprises the steps of recording one of said frames per track, and recording metadata in the remainder of said track.

25. A method of communicating source data comprising the steps of producing a concatenated data stream according to the data processing method claimed in claim 14, which includes the source data represented as compression encoded data with metadata, and communicating the concatenated stream via a transmission channel having a predetermined bandwidth, wherein the predetermined maximum data rate of the concatenated data stream is determined in dependence upon the predetermined bandwidth.

26. A computer program on a medium providing computer executable instructions, which when loaded on to a computer causes the computer to perform the method according to claim 14.

* * * * *